United States Patent [19]

Crosley et al.

[11] 3,898,395

[45] Aug. 5, 1975

[54] METHOD AND APPARATUS FOR TESTING COMMUNICATION SWITCHING SYSTEM JUNCTORS

[75] Inventors: Thomas W. Crosley, Northlake, Ill.; Howard R. Miller, College Station, Tex.; Leo J. Putchinski, Jr., Wheeling; Kenneth W. Vanderlei, Wheaton, both of Ill.

[73] Assignee: GTE Automatic Electric Laboratories Incorporated, Northlake, Ill.

[22] Filed: Feb. 27, 1974

[21] Appl. No.: 446,574

[52] U.S. Cl. .......... 179/175.2 R

[51] Int. Cl.[2] .......... H04M 3/26

[58] Field of Search .......... 179/175.2 R, 175.23; 340/172.5

[56] References Cited

UNITED STATES PATENTS

| | | | |
|---|---|---|---|
| 3,299,220 | 1/1967 | Wedmore | 179/175.2 R |
| 3,446,921 | 5/1969 | Denend | 179/175.23 |
| 3,626,383 | 12/1971 | Oswald et al. | 179/175.2 R |

*Primary Examiner*—Kathleen H. Claffy
*Assistant Examiner*—Douglas W. Olms

[57] ABSTRACT

A junctor testing arrangement for a communication switching system having a switching network for establishing connections selectively between calling and called lines under the control of common equipment including a plurality of registers for storing temporarily call processing information received from the calling lines via a plurality of register junctors, includes common testing circuits for communicating with the register junctors under test to send and to receive test information therebetween, switching circuits for coupling selectively the testing circuits to the switching network for interconnection with register junctors under test, and circuits responsive to equipment information stored in a computer central processor memory relating to each one of the register junctors to determine whether or not they are equipped with certain desired functions, such as providing senders and receivers, and circuits responsive to the equipment location for controlling the common testing circuits so that each one of the register junctors may be tested by the common testing circuits even though each one of the register junctors may be equipped in a different manner.

10 Claims, 13 Drawing Figures

METHOD AND APPARATUS FOR TESTING COMMUNICATION SWITCHING SYSTEM JUNCTORS

BACKGROUND OF THE INVENTION

1. Field of the Invention

The present invention relates to a method and apparatus for testing junctors in a communication switching system, and it more particularly relates to the testing of a series of register junctors of a communication switching system.

2. Description of the Prior Art

Communication switching systems, such as electronic telephone systems, have employed switching networks for selectively establishing connections between calling and called lines under the control of common equipment, which includes registers for storing temporarily call processing information, such as dialed digits, received from the calling lines. The registers are in the form of logic circuits sharing a memory on a time division multiplex basis and having space-divided peripheral units, such as register junctors for connecting the calling lines and the switching network in communication with the time division multiplex registers. Each one of the register junctors may be equipped for various different functions in accordance with the needs and capabilities of a given telephone switching system. In this regard, there is different ones of the register junctors may be provided with touch-calling multifrequency (TCMF) receivers or multifrequency (MF) receivers, and the register junctors may also be equipped with multifrequency (MF) senders. Moreover, any one of the register junctors may be provided with any one or more of the receivers or senders, or of all three. The senders and receivers provide for signaling between the lines and the switching system in the case of the TCMF receivers, or between the telephone central offices in the case of the MF receivers and senders.

In order to test the register junctors, it would be highly desirable to be able to provide test equipment which could test each one of the register junctors of a given telephone switching system even though the register junctors may be equipped differently. Also, it would be highly desirable to have testing equipment which would be generic in the sense that all telephone systems would have the same junctor testing equipment, even though each system may be equipped differently. Also, such a generic testing equipment should be able to handle additional register junctors added in the future for expansion purposes without the necessity of making drastic changes or additions to the testing equipment.

SUMMARY OF THE INVENTION

Therefore, the principal object of the present invention is to provide a new and improved method and apparatus for testing junctors in a communication switching system in such a manner that the junctors of a given system may be tested even though each one of the junctors is equipped differently for different operations.

Very briefly, the above and further objects are realized in accordance with the present invention by providing a method and apparatus which includes common testing circuit for communicating with the register junctors under test for sending and receiving test information therebetween, switching circuits for coupling selectively the testing circuits to the junctors under test, circuits for storing equipment information in the memory of a computer central processor concerning each one of the register junctors in the manner in which they are equipped for operation, and circuits responsive to the equipment information for selecting and controlling the common testing circuits so that only the equipment of particular register junctors are tested.

CROSS-REFERENCES TO RELATED APPLICATIONS AND PATENTS

The preferred system, including program information, incorporating the present invention, is disclosed in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 342,323, filed Mar. 19, 1973 now issued on Sept. 10, 1974, as U.S. Pat. No. 3,835,260. The system may also be referred to as No. 1 EAX or simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM.

The register-sender subsystem is described in U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued June 18, 1972 by J. W. Eddy for a MARKER PATH FINDING ARRANGEMENT INCLUDING IMMEDIATE RING; and also in U.S. Pat. application Ser. No. 281,586 filed Aug. 17, 1972 by J. W. Eddy for an INTERLOCK ARRANGEMENT FOR A COMMUNICATION SWITCHING SYSTEM now U.S. Pat. No. 3,806,659, issued Apr. 23, 1974, Ser. No. 311,606 filed Dec. 4, 1972 by J. W. Eddy and S. E. Puccini for a COMMUNICATION SYSTEM CONTROL TRANSFER ARRANGEMENT now U.S. Pat. No. 3,830,983, issued Aug. 20, 1974, Ser. No. 303,157 filed Nov. 2, 1972 by J. W. Eddy and S. E. Puccini for a COMMUNICATION SWITCHING SYSTEM INTERLOCK ARRANGEMENT now U.S. Pat. No. 3,809,822, issued May 7, 1974.

The communication register and the marker transceivers for communicating between the markers and the data processor unit of the system are described in U.S. Pat. application Ser. No. 320,412, filed Jan. 2, 1973 by J. J. Vrba and C. K. Buedel for a COMMUNICATION SWITCHING SYSTEM TRANSCEIVER ARRANGEMENT FOR SERIAL TRANSMISSION now U.S. pat. No. 3,814,859, issued June 4, 1974.

The executive or operating system of the stored program data processor unit is disclosed in U.S. Pat. application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM.

The computer line processor is disclosed in U.S. Pat. application Ser. No. 347,966 filed Apr. 4, 1973 by L. V. Jones and P. A. Zelinski for a SENSE LINE PROCESSOR WITH PRIORITY INTERRUPT ARRANGEMENT FOR DATA PROCESSING SYSTEMS now U.S. Pat. No. 3,831,151, issued Aug. 20, 1974.

Programs for communication between the data processing unit and the register-sender, in addition to the SYSTEM application, are disclosed in U.S. patent application Ser. No. 358,753 filed May 9, 1973 by F. A. Weber et al, now U.S. Pat. No. 3,819,865, issued June 25, 1974 by S. E. Puccini et al.

The scanner for the local automatic message accounting subsystem is disclosed in patent application Ser. No. 434,743, filed Jan. 18, 1974 by B. F. Gearing, M. R. Winandy, G. Grzybowski and D. F. Gaon; and in two articles in the GTE Automatic Electric Technical Journal, Vol. 13, No. 4 (October, 1972) at pages 177–184 and pages 185–196.

The magnetic tape unit of the local automatic message accounting subsystem is disclosed in patent application Ser. No. 434,743, filed Jan. 18, 1974 by B. F. Gearing et al.

The ticketing device buffer is disclosed in patent application Ser. No. 432,803, filed Jan. 14, 1974 for "TICKETING TRUNK SUPERVISION FOR A STORED PROGRAM COMMUNICATION SWITCHING SYSTEM" by L. Lattanzi et al.

The above patents, patent applications, and articles are incorporated herein and made a part hereof as though fully set forth.

DESCRIPTION OF THE PREFERRED EMBODIMENT

Figure 1:
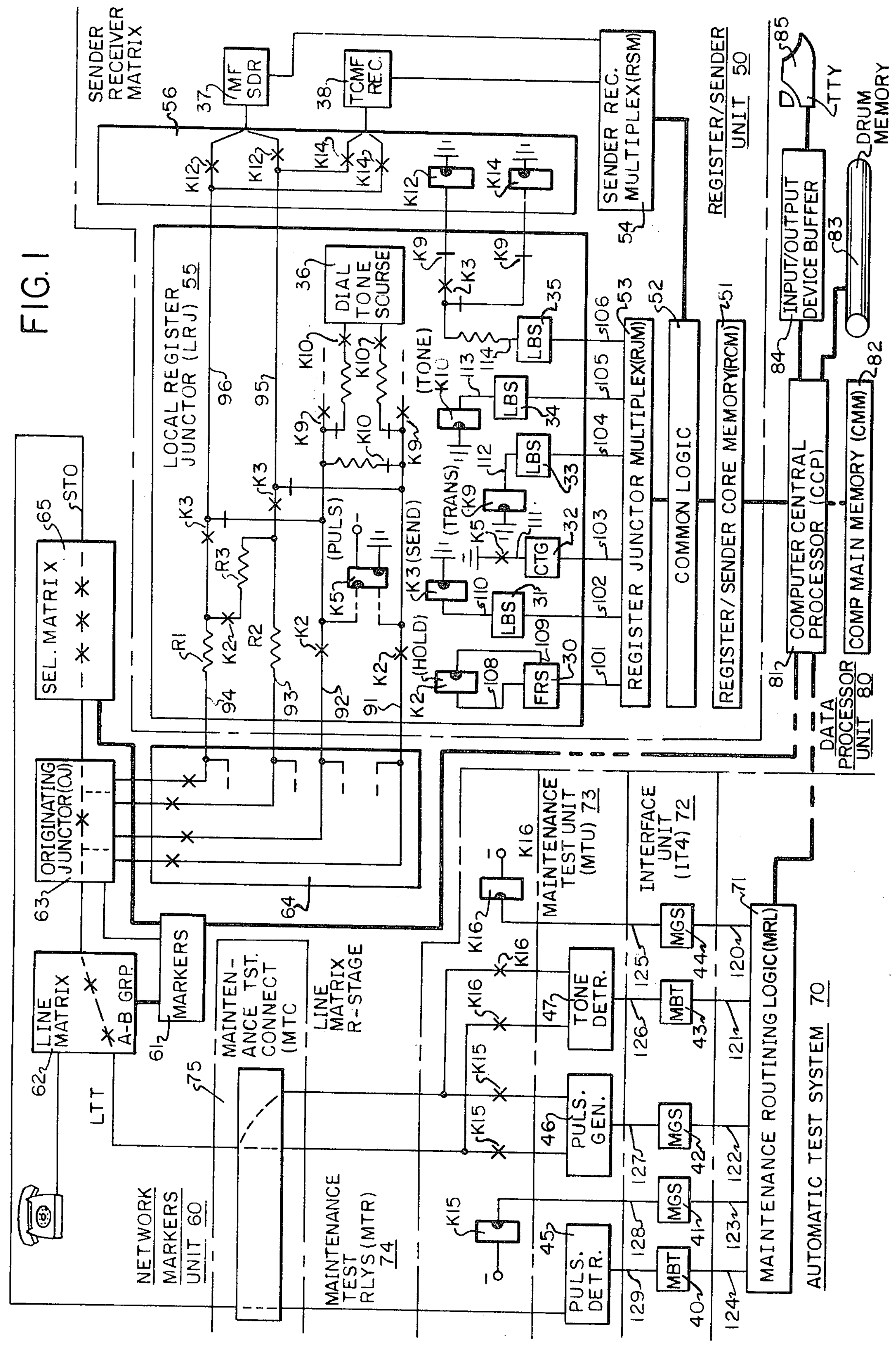
FIG. 1 is a block diagram of the testing arrangement incorporated into a communication switching system in accordance with the present invention.

Referring now to the drawings, and more particularly to FIG. 1, there is shown a communication switching system in the form of a telephone system including a stored-program data processing unit 80 which functions as the central coordinating unit and communication hub in the communication switching system for handling call processing and maintenance information. The unit 81 includes a central processor CCP for obtaining program instructions stored in the main memory 82, interpret each instruction, and perform the necessary operations specified by the instruction. The main memory CMM 82 stores the system control program, referred to as the system executive or operating program as well as those application programs whose frequency of usage requires that they be locally available. The drum memory 83 provides mass storage for translation data, diagnostic programs, tables and other such information. The input/output device buffer 84 provides the central processor with serial and/or parallel information concerning its associated teletypewriter device 85.

Associated with the data processor unit, but as a separate equipment group, is the automatic test system 70, which serves as a centralized facility for interfacing between the maintenance personnel, known as the "office craftsman" and the communication switching system and is the focal point for initiating test call routines and test programs, providing print-out of maintenance information, and provides special test equipment that are used in automatic testing in the exchange area. The ATS equipment is used to test the trunks residing in the local office and testing of customer's lines served by an office located beyond the supervisory limits of the local test trunks in the main office. The maintenance routining logic MRL 71 contains the electronic circuitry to provide sequence routining control for automatic testing of a communication switching system. The interface unit ITU 72 provides the necessary buffer logic from gates 40 through 44 between the electronic circuitry of the maintenance routining logic 71 and the electromechanical circuitry of the maintenance test unit MTU 73, which provides various circuits needed to generate pulses as in the generator logic unit 46 and receives signals as shown in detector logic 45 and 47 for routining the spacedivided equipment, and also to simulate other conditions necessary to complete the tests. The maintenance test relays MTR 74 include relays K15 and K16 used to establish connections between the various test units in the MTU and its inlets and outlets, which allows sharing of a particular test unit among two or more parts of the automatic test system. The maintenance test connect circuit MTC 75 is an electromechanical single-stage switching network, which concentrates all of the test inlets and outlets of the network used for automatic testing into four unique circuits, only two representative ones of which are discussed herein, namely, the line test inlet LTI and the selector test outlet STO.

The network-markers unit 60 provides access into the communication switching system with high speed control to connect any call through the system to the desired destination. The markers 61 are electronic logic units which control the selection of idle paths and the establishment of connections through the matrices. The line matrix A-B group 62 allows access into the communication switching system from subscriber equipment and sets up paths to originating junctors 62, providing concentration from many line inlets to lesser originating junctors. The line matrix R-stage 64 provides a concentrating matrix that allows the originating junctors to access lesser local register junctors LRJ. An originating junctor 63 is used for every call originated from a local customer's line, and remains in the connection for the duration of the call. The originating junctor extends the calling line's signaling path to the register junctor 55 in the register/sender unit 50 and at the same time provides a separate signaling path from the register junctor to the selector matrix 65. The originating junctor maintains the calling line isolated until cut-through is effected, at which time the calling party is switched through to the selector matrix inlet. The selector matrix 65 provides for intermediate mixing and distribution of the traffic from various trunks and junctors on its inlets to various trunks and junctors on its outlets, and interconnects originating junctors 63 and other equipment with special local facilities, as shown in FIG. 1, and other equipment on its outlets.

The register/sender unit 50 is a time-shared common control unit with the ability to register and process a large number of calls simultaneously from local lines or incoming trunks. The register/sender core memory RCM 51 stores digits to be received and sent, and supervisory information pertaining to the call. The common logic 52 contains the control logic for call processing by the register/sender. The register junctor multiplex RJM 53 provides an interface between the space-divided register junctors 55 and the time-shared common logic 52, and converts time-shared signals to space-divided signals for controlling the register junctors and the register/sender RJM multiplexes space-divided signals for return to the common logic. The sender/receiver multiplex RSM 54 converts time-shared common logic signals to space-divided signals for controlling the senders and receivers that relate to a call in process. The senders 37 provide for sending in the multifrequency MF mode, while the receivers 38 provide for receiving in the touch calling multifrequency TCMF mode from customer's lines. The sender/receiver matrix 56 provides a concentration of the traffic from the register junctors to the senders and/or receivers, all under control of the common logic. The local register junctor 55 is the entry and exit port in the register/sender for information signaled through the switching network. It provides a facility for dial pulse sending and receiving, dial tone, other signaling previously described, and an interface between the common logic unit and switching network and markers. Signals from lines and network circuits are received by the register junctor and forwarded to the common logic for processing.

Considering now the testing arrangement with reference to FIG. 1, only the relevant portion of the local register junctor 55 is shown for sake of simplicity to consist of five relays, it being understood that more relays are required to perform all of the register junctor functions as more fully described in the above-cited patents. The junctor is one of 192 such junctors and is equipped with an MF sender 37 and a TCMF receiver. It is to be understood that the other register junctors (not shown) may be equipped differently with any permutation or combination of types and kinds of senders and receivers. In accordance with the present invention, a call processing table of equipment information is stored in the memory 82 concerning how each one of the register junctors is equipped so that the information stored in the table can be used to perform the junctor tests and thus the ATS system 70 can determine which tests to perform for each one of the junctors as hereinafter described in greater detail. Relay K5 responds to battery and/or ground pulses on leads 91 and 92, and when operated, the relay K5 contact forwards a positive ground potential to test gate 32, which signals the common logic 52 through the register junctor multiplex 53. Relay coil K2 is energized by gate 30 from the common logic 52 to the register junctor for connecting leads 91 and 92 to the switching network line matrix R-stage and for connecting leads 93 and 94 together through resistors R1, R2 and R3. The relay coils K3, K9 and K10 are energized by negative battery potential switched from the respective gates 31, 33 and 34, which are turned on by the common logic 52 through the register junctor multiplex 53. Relay K3 functions to transfer MF sender 37 or TCMF receiver 38 logic on leads 95 and 96 to either leads 91 and 92 or 93 and 94, while relay K9 connects leads 91 and 92 to the dial tone source 36. LBS gate 35 provides seizure of the sender receiver matrix 56 relay coil K12, which connects leads 95 and 96 to either the MF sender 37 or the TCMF receiver 38 in accordance with the present invention as hereinafter described in greater detail. The operation of the register junctor relays are checked by the maintenance test unit 73 logic circuits 45, 46 and 47. Pulse generator 46 supplies the battery and ground pulses to check the operation of relay K5 in the local register junctor. The maintenance routining logic 71 turns on MGS logic 42 to enable the pulse generator. Gates 45 and 47 detect the operation and release of relay K3, while gate 47 also detects the release of relay K9 in the system LRJ. Relay coils K15 and K16 are energized by MGS gates 41 and 44 respectively, to connect checking gates 46 and 47 to the maintenance test connect 75 circuit for testing of the system LRJ.

The main battery test gates designated MBT shown in FIG. 1 are circuits, when a positive ground potential is applied to its input or its input is open circuited, supplies a true signal at its output, but when a negative battery potential is supplied thereto, a false indication is generated at its output. The main ground switch drivers illustrated in the drawings and designated MGS are electronic circuits to switch a positive ground potential that sometimes is used to operate relays as shown in operating relays K15 and K16, but also is used to signal a circuit to begin operation as shown by MGS 42, and the MGS may comprise two transistors connected so that when a true signal is supplied at the input, ground potential from the main ground switch is connected via the emitter-collector path of the output state in saturation to a source of a negative battery potential. The low current main battery switches shown in the drawings and designated LBS are electronic switches which are similar to the main ground switches except that the LBS circuits switch negative battery potential instead of a ground potential. The foregoing mentioned gates and switches are more fully described in the above-cited patents, and are used to convey information via other equipment to and from the processor 81, which functions in response to program information stored in memory 82 as hereinafter described in greater detail.

The TCMF receivers and MF receivers are used to test register junctors because they test the full capabilities of the register junctors. More specifically, they are used to test the K3 relay in the register junctor as well as leads 95 and 96 through the sender receiver matrix 56 as shown in FIG. 1, as well as testing the ability of the register junctor to connect and disconnect the receiver and transmit digits in an encoded form. If no receivers are accessible to a system local register junctor LRJ, the described functions are performed in accordance with the present invention by testing the combination of the system junctor LRJ and an MF sender, which is accessible to the register junctor. If neither receivers nor senders are accessible to a system junctor LRJ, then the functions disclosed previously need not be tested for they are not normally used in that configuration.

Briefly, in operation the local register junctor operates LBS switch 35 to operate relay K12 for connecting the touch calling multifrequency TCMF receiver 38 to the leads 95 and 96, and signaling the maintenance routining logic 71 is signaled by an instruction received from processor 8, to send one digit to the TCMF receiver from pulse generator 46. Then, the presence of the digit is checked in the register sender memory 51. The local register junctor disconnects the TCMF receiver 38 by operating relay K3 and connects the dial tone source 36 by operating relay K10, which allows dial tone to be sent and detected by tone detector 47 in the maintenance test unit 73. The MF sender 37 outpulses through relay K3 transfer contacts being operated and on leads 95 and 96 through originating junctor 63, selector matrix 65, maintenance test connect 75 to pulse detector 45. The local register junctor is further routined by the logic shown in FIG. 1, but will not be described in detail since it is not essential to the method and apparatus of the present invention. The register junctor multiplex 53 provides control signals to gates 30, 31, 33, 34 and 35 from leads 101, 102, 104, 105 and 106 respectively to signal the gates to turn on and provide a potential on leads 108 and 109, 110, 112, 113 and 114 respectively, while a positive ground potential is switched to turn on gate 32 from lead 111 and provide a true signal on lead 103 for signaling the common logic 52 through the register junctor multiplex 53. Relays K2, K3, K9, K10 and K12 are controlled by gates 30, 31, 33, 34 and 35 respectively and provide holding, sending, transfer, tone and matrix hold capabilities respectively for the local register junctor. Relay coil K5 is energized by leads 91 and 92 to provide a pulsing operation through relay K5 contacts switching a positive ground potential to lead 11 and energizing CTG gate 32.

Considering now the arrangement in greater detail, the main battery test gate 40 has its output connected to lead 124 to signal the maintenance routining logic 71 and has its input connected to pulse detector 45 through lead 129, and which in turn is connected through the maintenance test connect 75 to the selector matrix 65, which is connected through the originating junctor 63 and line matrix R-stage 64 to the local register junctor 55 on leads 93 and 94. The LBS gate 31 has its output lead 110 connected to relay coil K3 and its input lead 102 connected to the register sender multiplex 53. Leads 93 and 94 are connected through relay K3 contacts to leads 95 and 96 respectively, which in turn are connected through relay K12 contacts to MF sender 37. Relay coil K12 being operated by output lead 114 from LBS gate 35, which has its input lead 106 connected to register junctor multiplex 53. The main battery test gate 43 has its output lead 121 connected to the maintenance routining logic 71 circuits and its input lead 126 connected to tone detector 47. The main ground switch 44 has its output lead 125 connected to relay coil K16 and its input lead 120 connected to MRL 71. The tone detector 47 has two input leads connected through the contacts of relay coil K16 to maintenance test connect 75, which in turn is connected through line matrix AB-group 62, through originating junctor 63 and line matrix R-stage 64 to local register junctor 55 leads 91 and 92. The LBS gate 34 has its output lead 113 connected to relay coil K10 and its input lead 105 connected to RJM 53. The LBS gate 33 has its output lead 112 connected to relay coil K9 and its input lead 104 connected to RJM 53. With relay coil K10 energized and relay coil K9 not energized, register junctor leads 91 and 92 are connected to dial tone source 36. The main ground switch 42 has its output lead 127 connected to pulse generator 46 and its input lead 122 connected to MRL 71. The MGS 41 has its output lead 128 connected to relay coil K15 and its input lead 123 connected to MRL 71. The MRL unit 71 advances to the sequence state that energized MGS 41 and subsequently relay coil K15 with its contacts switching the pulse generator 46 to the maintenance test connect unit 75, which in turn is connected through the line matrix AB-group 62, originating junctor 63, line matrix R-stage 64 to the local register junctor leads 91 and 92. Then relay coil K9 is energized by LBS switch 33 and the contacts of relay K9 disconnect the dial tone source 36 from leads 91 and 92. The MGS switch 42 is energized by MRL unit 71 to turn on pulse generator 46, which signals relay coil K5 to operate and close its contact to switch a positive ground potential to the input lead 111 of CTG gate 32, which generates a true signal on its output lead 103 to signal the common logic 52 through the register junctor multiplex 53.

Considering now the operation of the test arrangement of the present, the first part of the local register junctor LRJ check is to test the ability of the junctor to access the sender/receiver matrix 56. This is normally done by connecting a touch calling multifrequency TCMF receiver 38 to the local RJ 55, and instructing the maintenance routining logic 71 to send one digit to the receiver from pulse generator 46. Part of this connection process occurs with the relay coil K9 not operated and with relay coils K2 and K3 operated to apply pull battery potential to the sender receiver matrix relay coil K12 when the low current battery switch LBS 35 is operated from the common logic 52 through the register junctor multiplex 53, while in turn a resistive loop comprised of resistors R1, R2 and R3 is placed across the sender/receiver matrix 56 leads 95 and 96 to operate a battery feed relay (not shown) in the TCMF receiver 38. Relay coil K3 is then de-energized by turning off LBS gate 31, to establish a connection from leads 91 and 92 which are connected to the pulse generator 46, to leads 95 and 96 respectively to allow the maintenance routining logic 71 to signal the pulse generator 46 to outpulse a digit to the TCMF receiver 38. The register sender is then instructed to apply a dial tone signal by operating relay coil K10 through turning on LBS gate 34. The dial tone source 36 circuit is then connected from contacts of relay coil K10 to leads 91 and 92, and in turn this tone is detected by the tone detector 47 circuit, which signals the logic circuits of the MRL unit 71 by operating MBT gate 43 in the interface unit 72. Upon detection of dial tone, the maintenance routining logic 71 advances sequence states, and outpulses the digit placed in its output buffer. For more information concerning the MRL unit, reference may be made to T. Crosley patent applications Ser. No. 348,806, filed Apr. 6, 1973 now U.S. Pat. No. 3,812,337, issued May 21, 1974, and Ser. No. 370,560, filed June 15, 1973 now U.S. Pat. No. 3,851,120, issued Nov. 26, 1974. The digit is received and forwarded to the common logic 52 to be stored in the register sender memory 51. The register sender 50 then generates an interrupt to the data processor unit 80. The maintenance routining logic 71, upon completion of sending and the detection of no dial tone, which is removed automatically by the register sender unit 50 upon receiving the first digit, also generates an interrupt. After both interrupts have been received the register sender memory 51 is checked by software for the proper digit received. The register/sender is then instructed to drop the TCMF receiver and continue with the remainder of the local register junctor testing, which includes establishing a switching network path from the originating junctor 63 through the selector matrix 65 to the STO and thus into the automatic test system for verifying the dial pulse sending capabilities of the LRJ, which is not part of this disclosure.

SOFTWARE OVERVIEW

Software Procedures

As mentioned previously, program information is stored in the memory 82 of FIG. 1 for controlling the method and apparatus of the present invention. Any time a request for routining all register junctors in an RS section is received by the system ATS, it is placed in the "TIM" queue. The system ATS software will begin processing the request by determining the first RJ to test. The identity of the RJ along with data which indicates the availability of senders and receivers is passed to a routining module.

The routining module then tests the RJ fully (receiver available) or in an abbreviated manner. If the full test was performed or the RJ determined to be defective, the routining module returns control to a module string which will generate the identity of the next RJ to test after performing some "housekeeping" functions.

If an abbreviated test was performed successfully, the RJ has not been fully tested (K3 relay, etc.) and a check will be made to determine if MF senders are accessible to the RJ. If an MF sender is not available, the routining module will return control as described above.

If an MF sender is accessible to the RJ, a single unit routining request is added to the system ATS "TAP" queue. This request is one to routine an MF sender utilizing the RJ previously routined. Control is then returned to the module string previously mentioned.

Since the "TIM" queue job is interruptible by a "TAP" job, the TIM job will be temporarily stopped and the single MF sender-RJ routine will be executed to verify the functions of the RJ which were not able to be tested previously. At the completion of the MF sender test, the TIM job will be restarted and the RJ routining continued (refer to EN-1494 for interruption details) until completion.

Normally the interruption of a "TIM" queue job by a "TAP" queue job would be accompanied by a number of messages. However, special indicators were passed by the routining module when the MF sender request was added to the TAP queue, which will inhibit all the TAP queue messages except for errors or a trouble report.

This description has been a very brief overview of the routining process when register junctors are tested without proper receivers. The following four examples explain this case in detail.

PROGRAM OPERATION

The following is a description, by way of examples, of the block diagram (FIG. 2) and flow charts (FIGS. 3–9). Four examples will be discussed:

1. Teletype and program TAP single-unit job, with a receiver available. (No routining presently in progress.)
2. Teletype and program TAP single-unit job, with no receiver available.
3. Time-constraint TIM multiple-unit job, with no receiver available but with a sender available.
4. Time-constraint TIM multiple-unit job, with no receiver or sender available.

All of the above examples will be requests for local register junctor LRJ routining; however, except for some details of the routining module (FIG. 8) the description would be the same for incoming register junctor IRJ routining.

Figure 2:
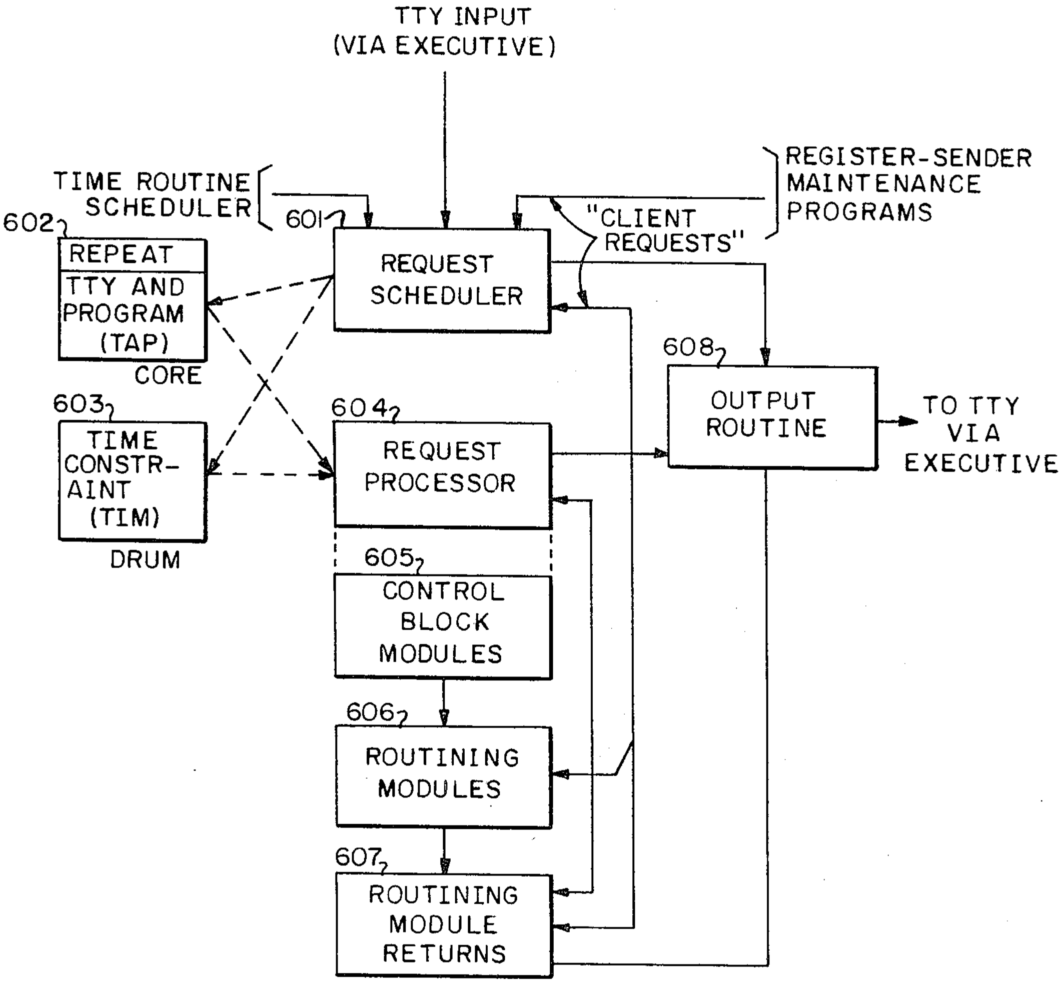
FIG. 2 is a block diagram of the program modules for controlling the method and apparatus of the present invention.
Figure 3A:
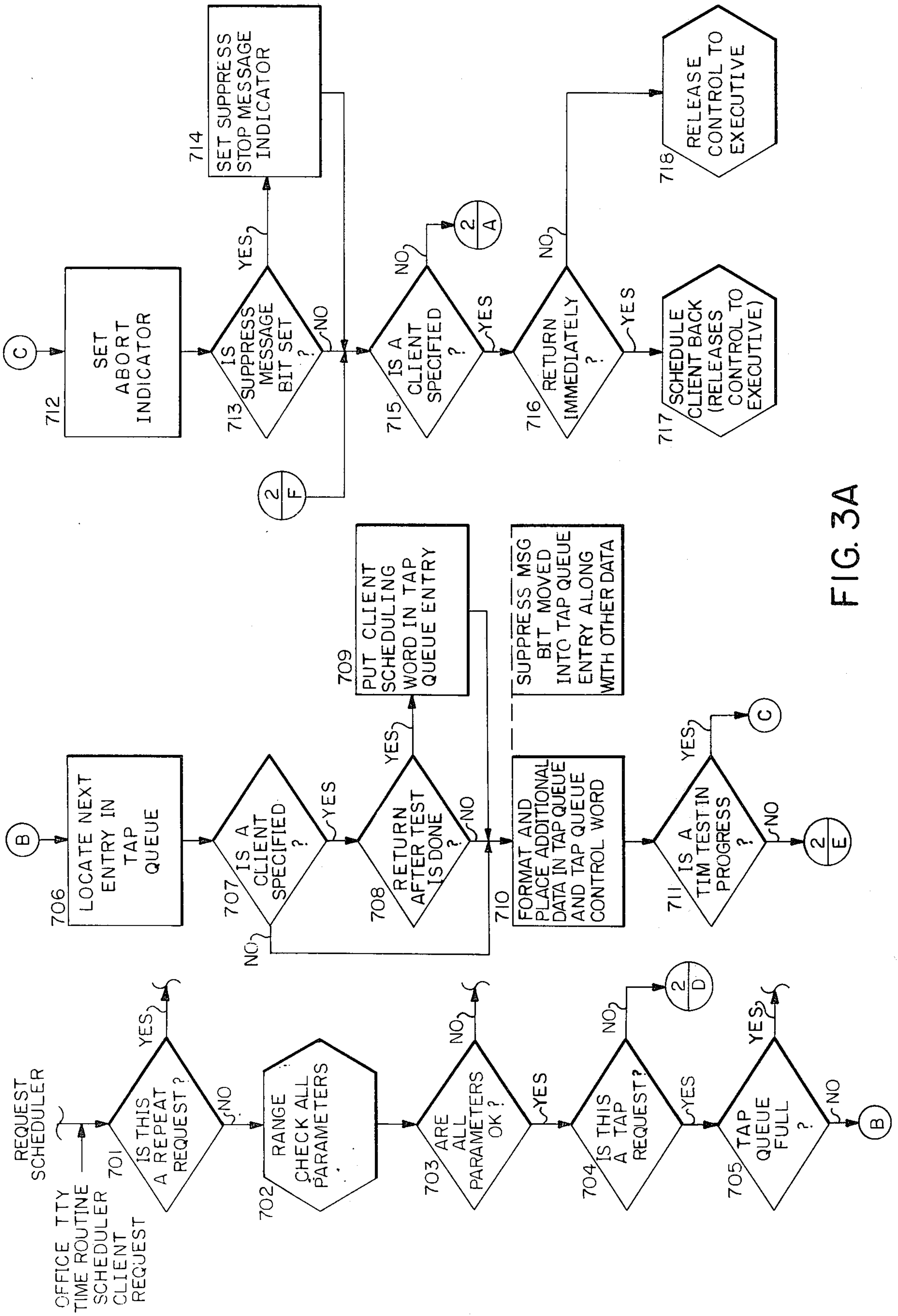
FIGS. 3 – 9 are flow chart diagrams of the programs for controlling the method and apparatus of the present invention.
Figure 3B:
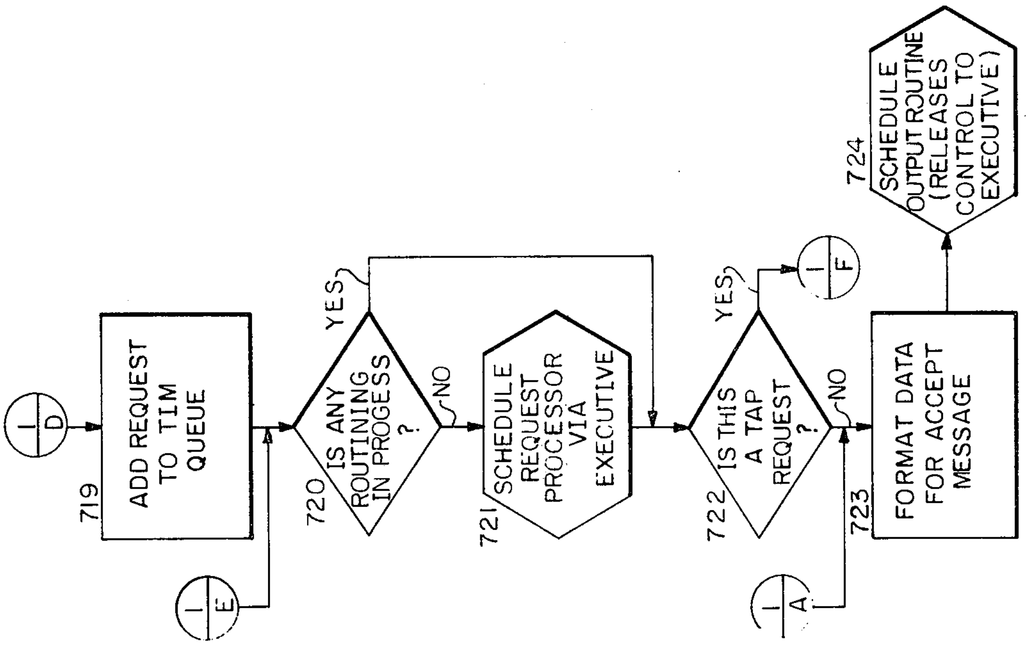
Figure 4A:
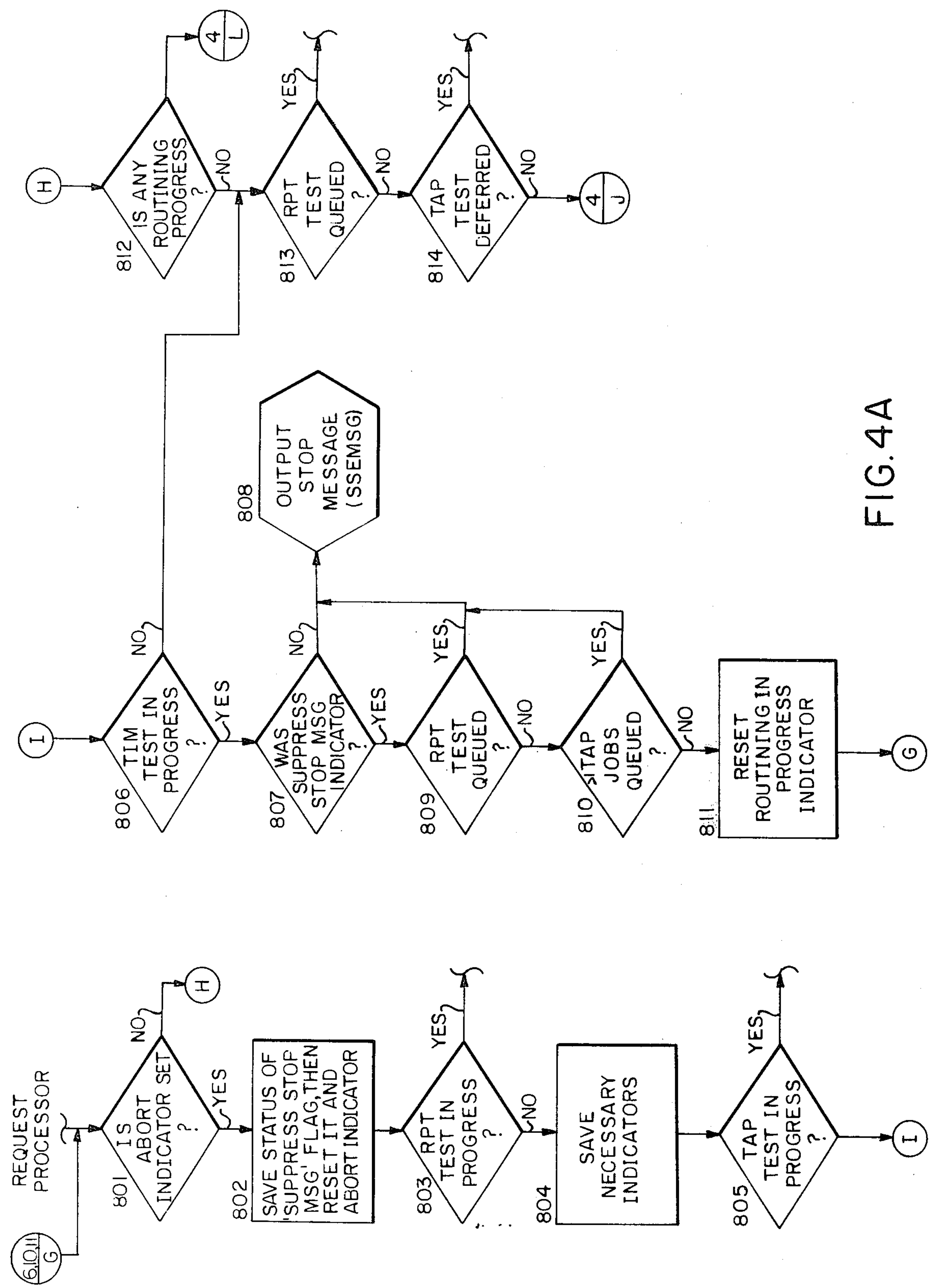
Figure 4B:
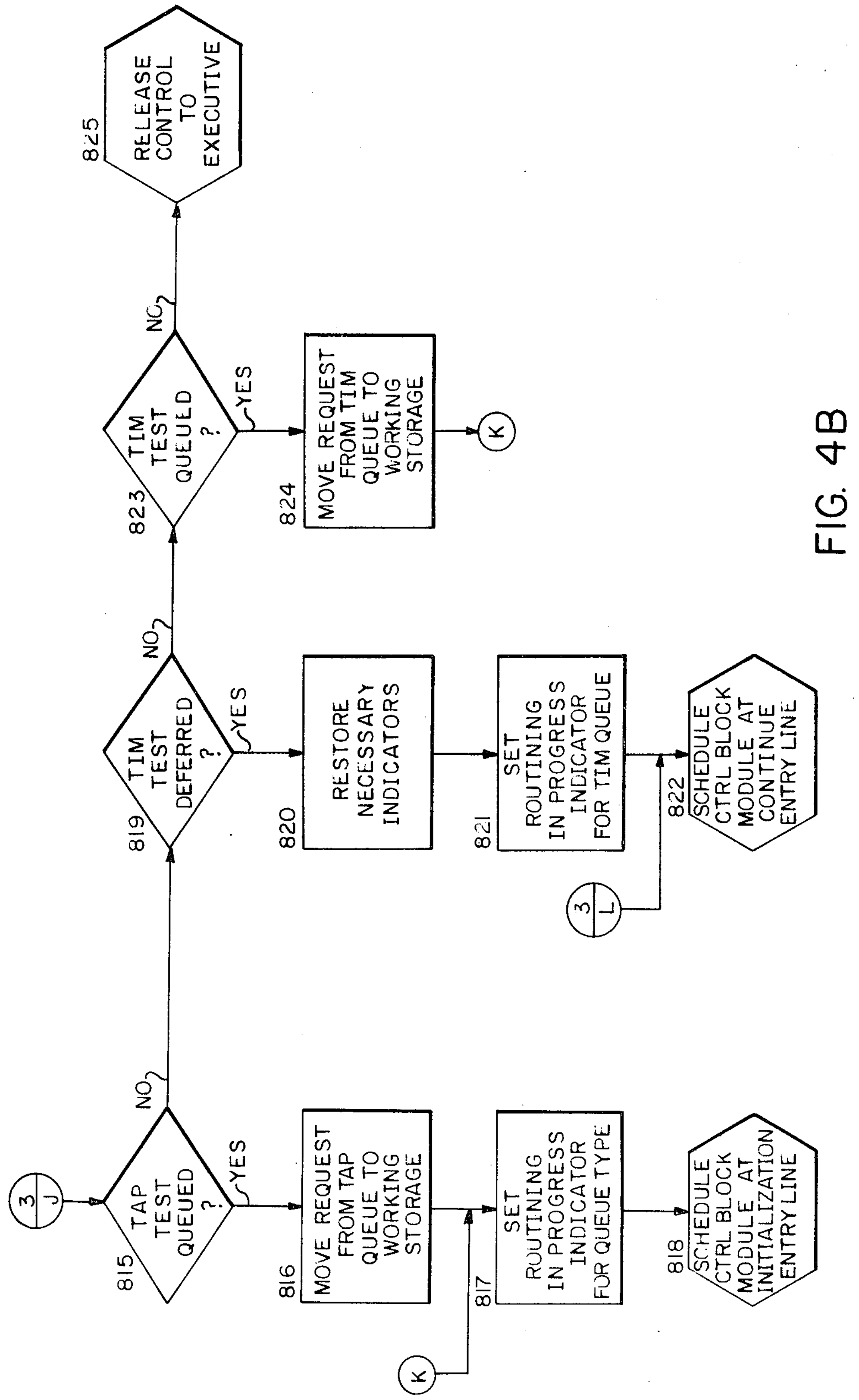
Figure 5:
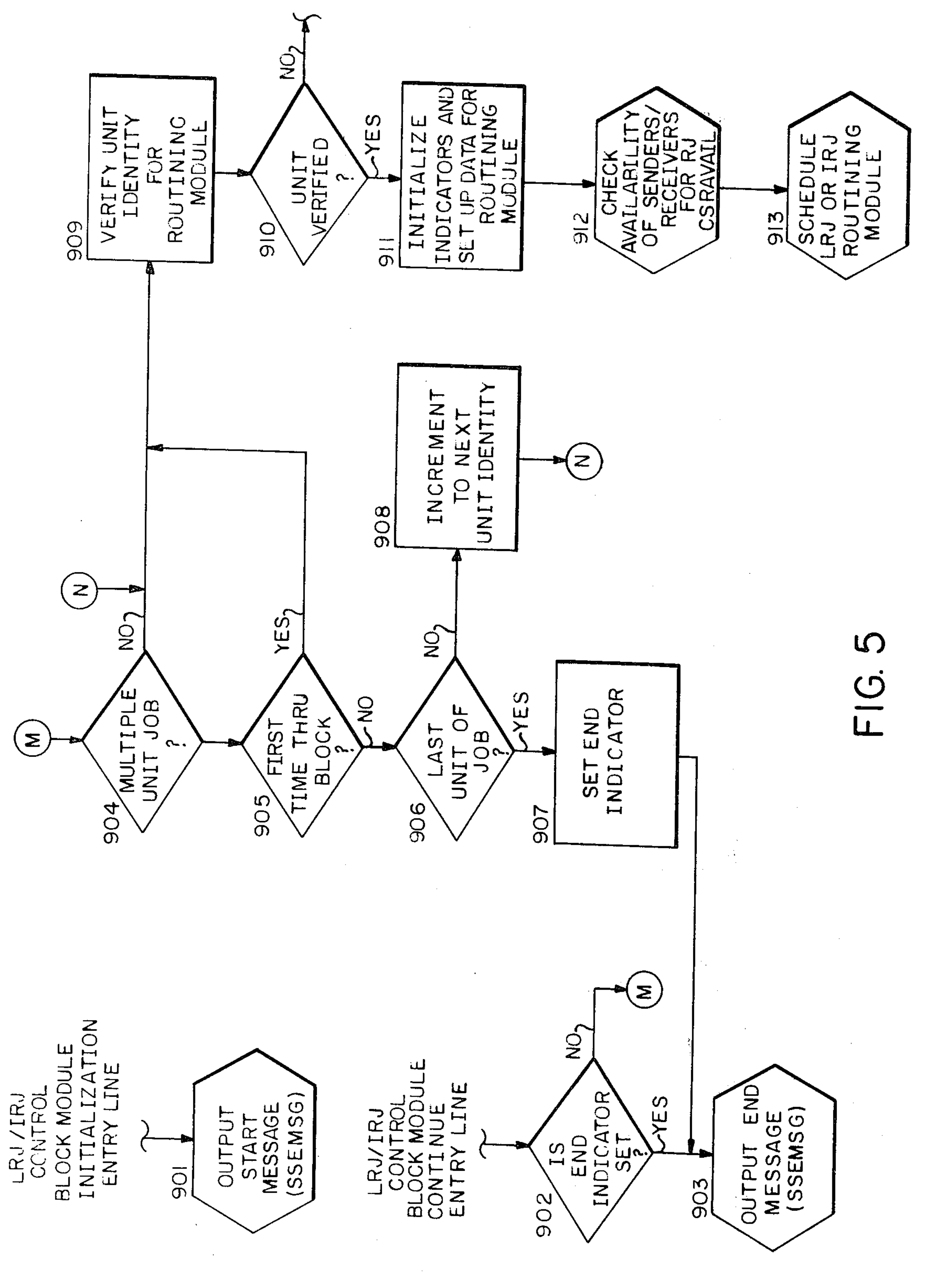

The overall flow of the automatic test system ATS software is shown in FIG. 2. Requests come into the request scheduler 601 from either the office teletype TTY, the timed routine scheduler TRS; or as a "client request" either from the register-sender RS maintenance programs or the register junctor RJ routining modules 606. The request scheduler verifies and adds the request to either the repeat, teletype and program TAP, or time-constraint TIM queues (blocks 602–603). Only the latter two queues will be discussed in this disclosure.

For all but client requests the request scheduler also outputs an ACCEPT message via the output routine 608. The request processor 604 then gets control, and upon finding the request in one of the queues, sets up data in working storage for one of the control block modules 605. The control block first calls a subroutine in the request processor, which normally results in the printing of a START message. The control block gets control again, and verifies the unit identity of the particular unit to be tested before setting up data for a routining module 606. The test may be for a single unit, or for multiple units (in which case the control block verifies the identity of each unit to be tested between a low and high bounds).

The routining module performs the actual routine, interfacing with the rest of the system (including the markers during path setup, the register sender RS, and the automatic test system ATS hardware, FIG. 1). At the end of the routine, it returns to the routining module returns module 607 with anall tests passed ATP, failure, or other indication (such as path blockage). The routining module returns module pegs the pass, failure, or blockage, and outputs an ATP message for a pass (for single unit non-client jobs only), a trouble report TR for a fail, or other messages as required. It then returns control to the request processor, which brings in the control block module.

If the test is not ended yet (e.g. the middle of a multiple unit test), the control block verifies the identity of the next unit to be tested. If it is the end of the test, it calls a subroutine which normally outputs an END message.

EXAMPLE 1

A teletype and program TAP single unit job with a receiver available will now be described. The request comes into the request processor (FIG. 3) from the office teletypewriter via the executive 701. The parameters are range checked (blocks 702–703) and the request is added to the teletype and program TAP queue (blocks 705–710). Since the input came from the office teletype, it is not considered a client job; therefore the client scheduling ward is not filled in as shown in 709. Routining was assumed not to be in progress; therefore the request processor is scheduled (block 721, via 711, 720) and an "ACCEPT" message is outputted (block 724, via 722, 715, 723) on the teletypewriter.

The request processor (FIG. 4) which was scheduled in block 721, is given control. The abort indicator will not be set (block 801) and no routining is in progress (block 812), so the queue scan is initiated. The teletype and program TAP request is found in block 815 (via 813, 814). The request is moved to working storage, the routining in progress indicator is set, and the appropriate control block module (in this case local register junctor LRJ) is scheduled, based on the requested main test mode MTM.

Figure 6:
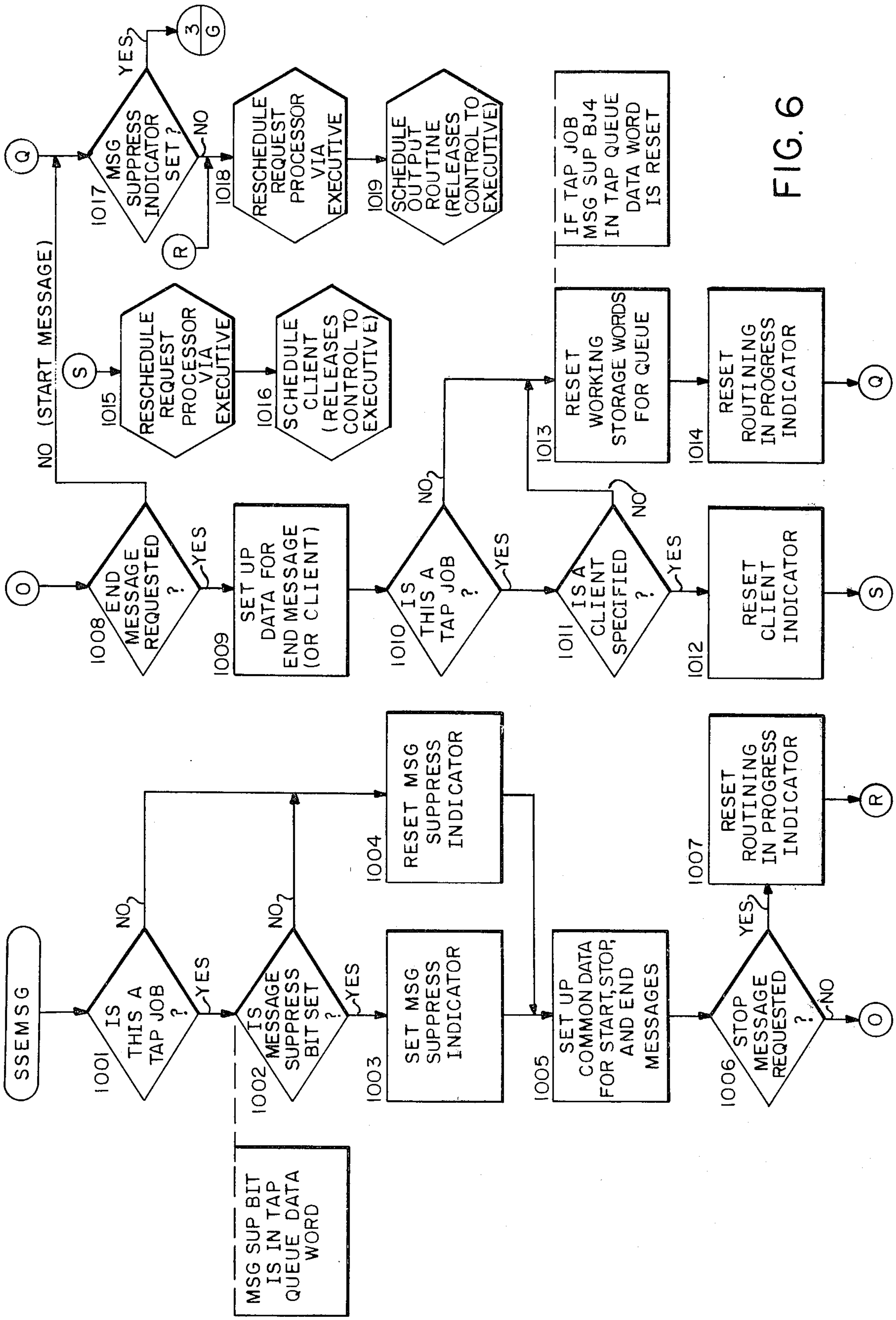

The initialization entry line 901 of the control block (FIG. 5) is given control, which results in the calling of subroutine SSEMSG (start/stop/end message), FIG. 6, to output a START message. For teletype and program TAP jobs, subroutine SSEMSG first checks the message suppression bit in the queue data word (blocks 1001, 1002) which in this case will not be set. Data is set up for the START message (block 1005), the request processor is rescheduled (block 1018, via 1006, 1008, 1017), and the message is outputted (block 1019).

The request processor, upon getting control again, finds the routining in progress indicator set (block 812, via 801), and gives control back to the control block module at its continue entry line (block 902). The end indicator is not set, so next the unit identity of the single unit to be tested is verified (blocks 709–910). Indicators are then initialized and data is set up for the routining module (block 911).

Figure 7:
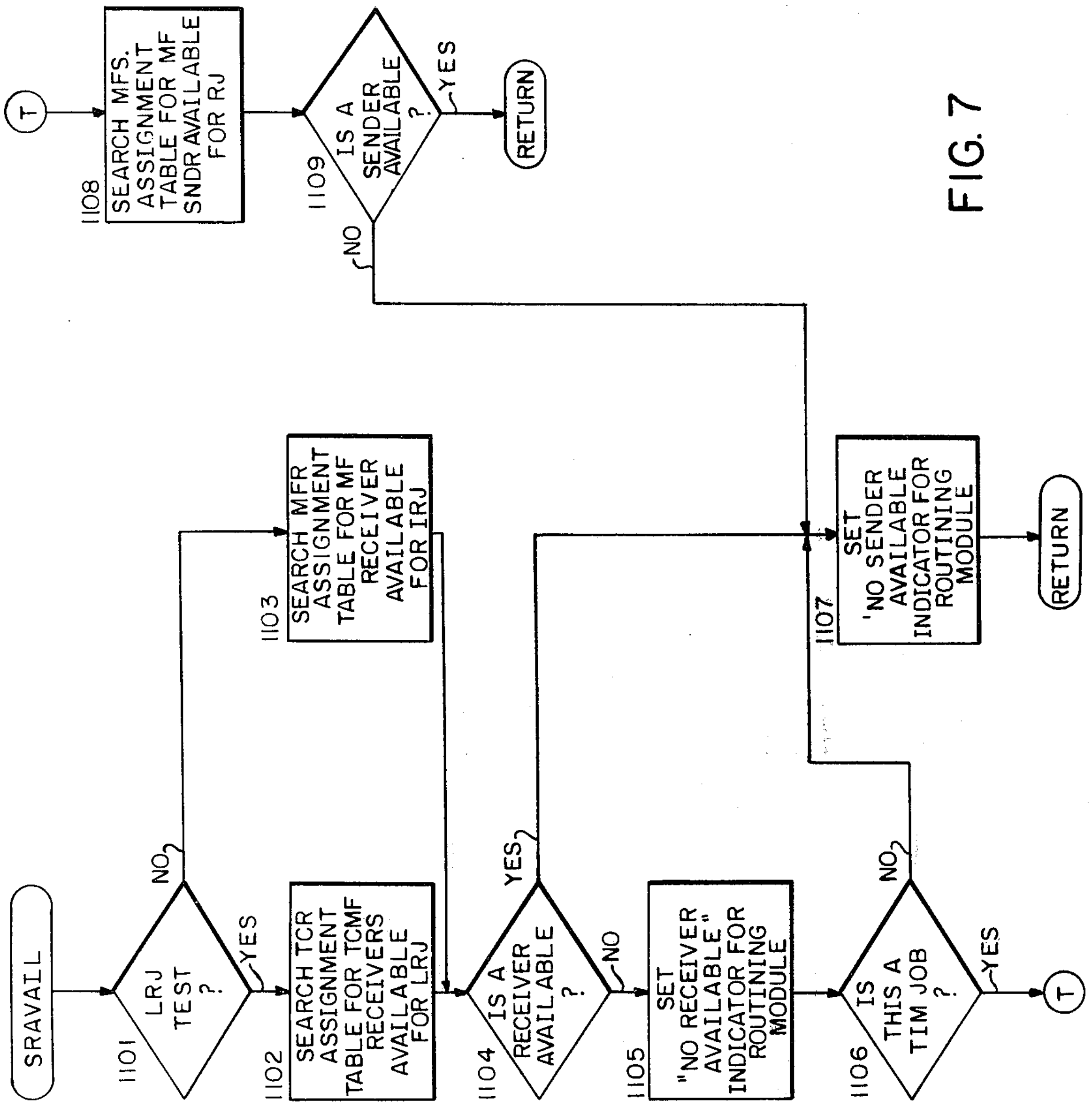
Figure 8A:
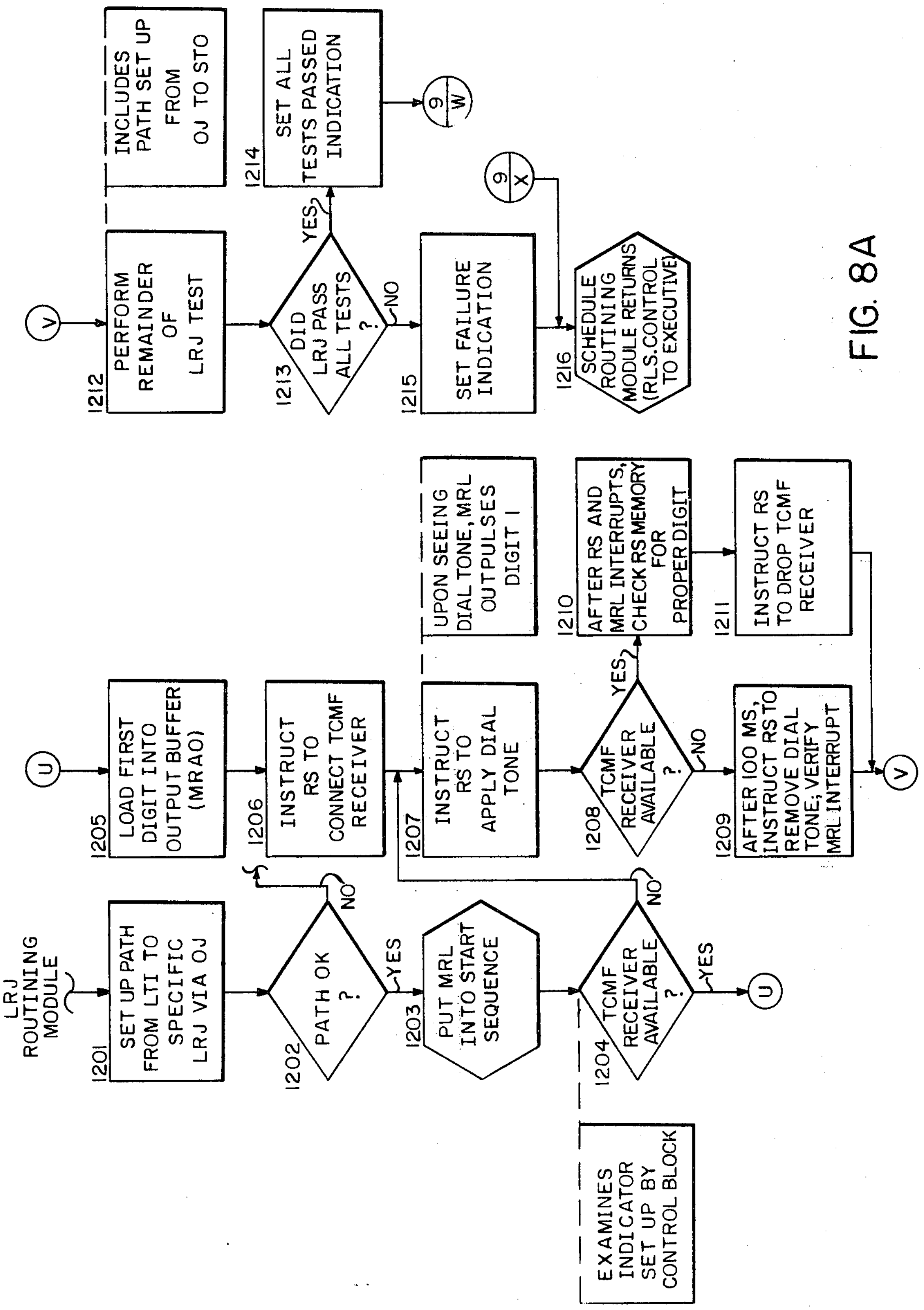
Figure 8B:
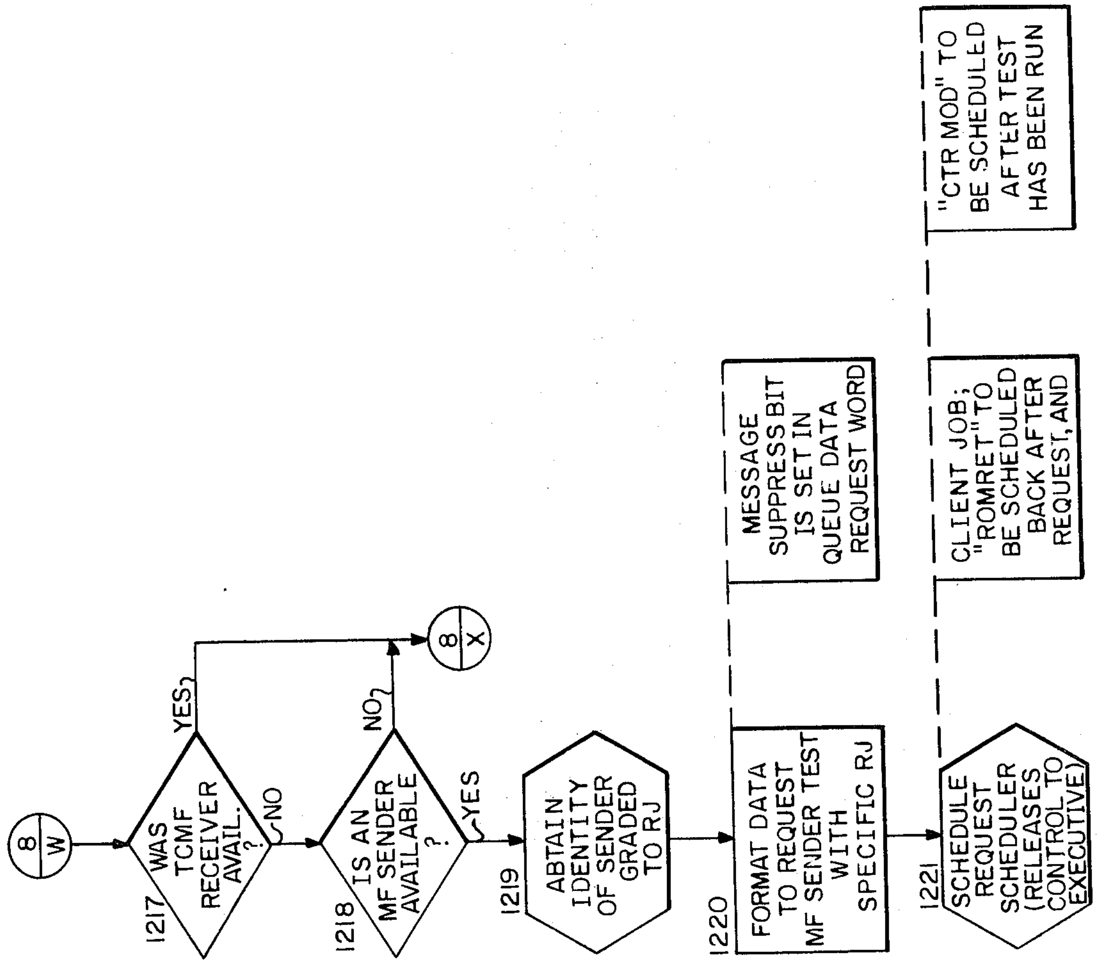
Figure 9A:
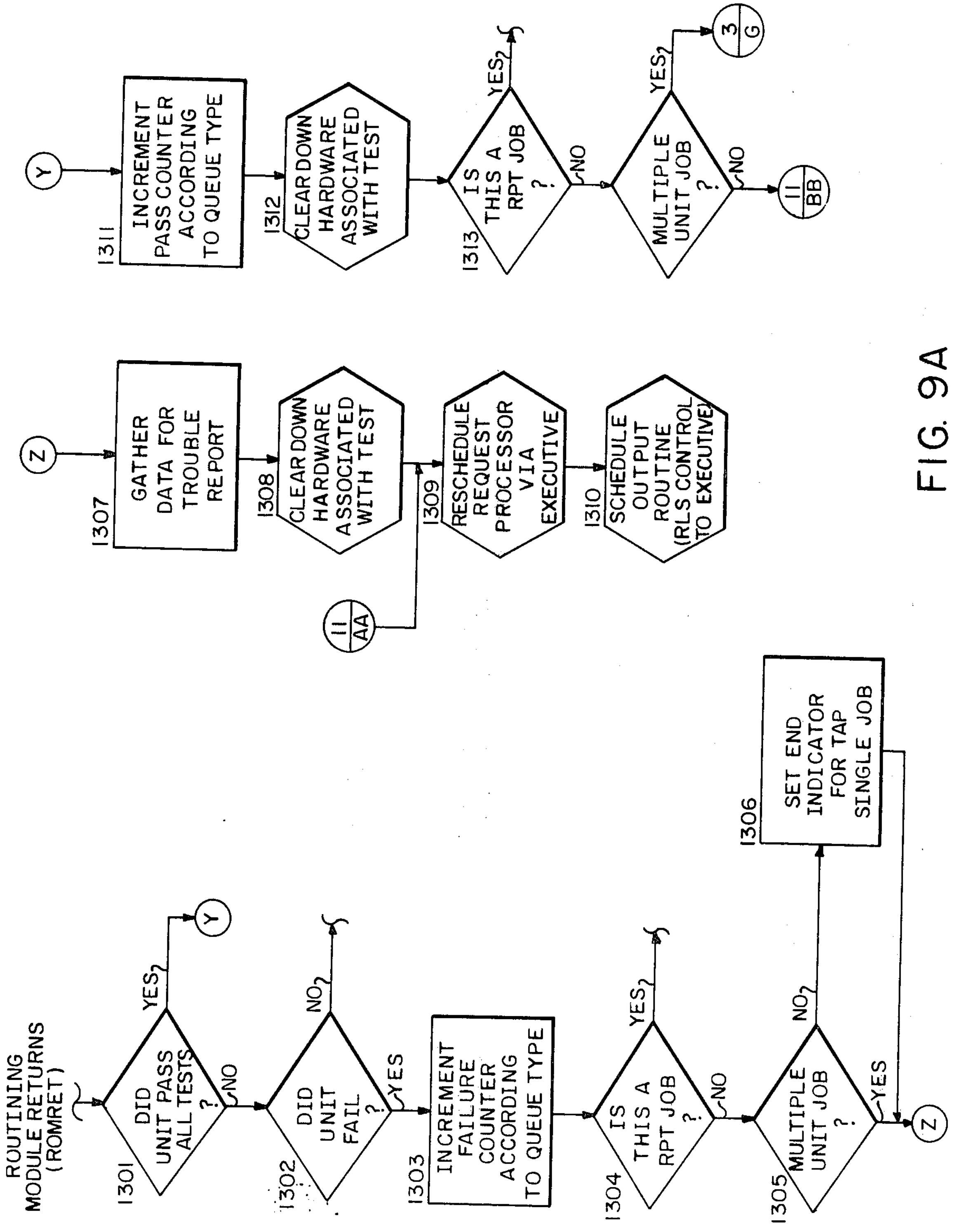
Figure 9B:
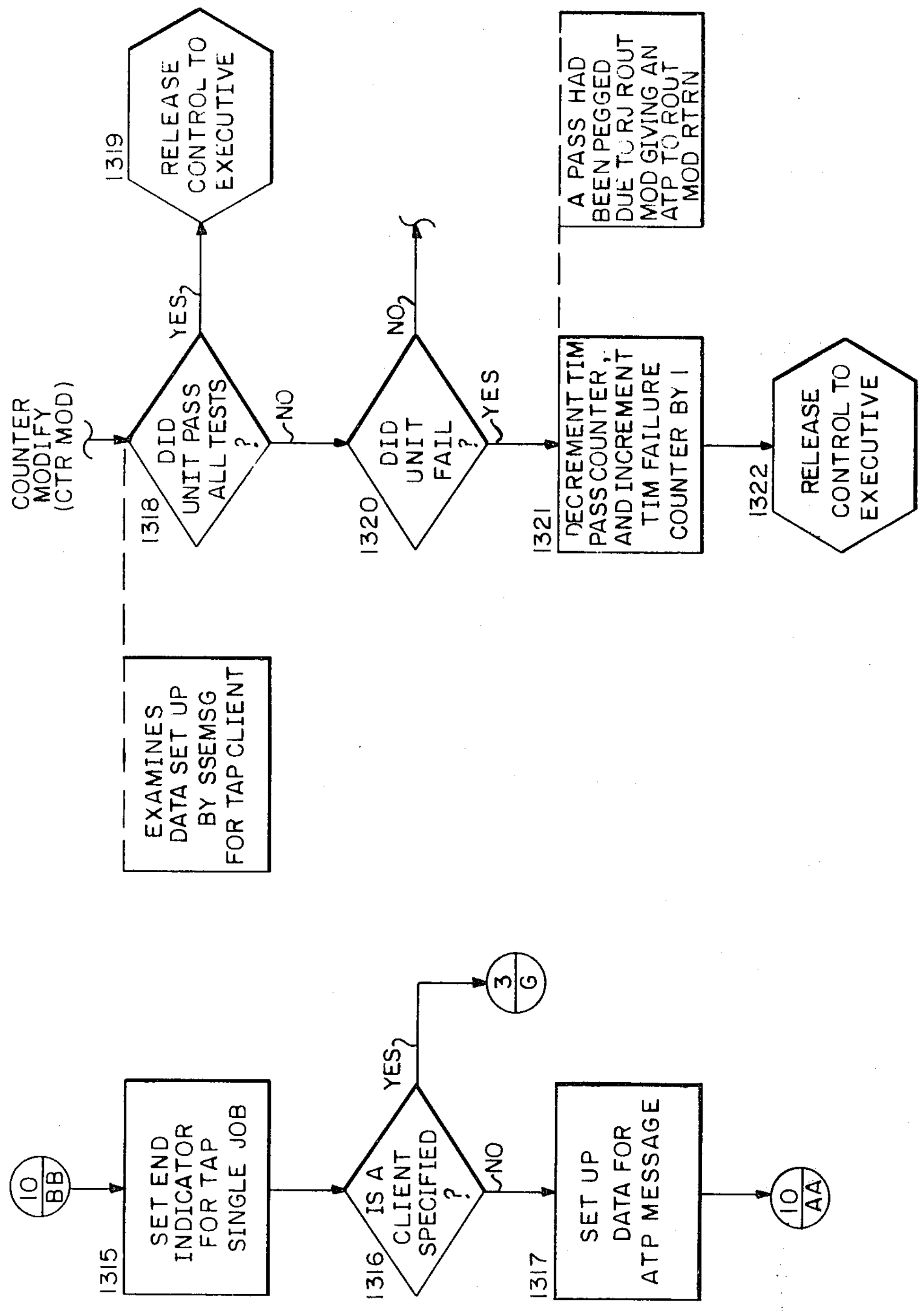

As shown in FIG. 7, the control block then calls (block 912) subroutine SRAVAIL (sender/receiver available) to check for the availability of senders and receivers for testing the register junctor RJ. This subroutine is the means by which the software is made to be generic. For a local register junctor LRJ test, the touch calling receiver TCR assignment table is searched for receivers available to the local register junctor LRJ (block 1102, via 1101). This table is used by call processing, and no special requirements are placed upon it by the automatic test system ATS software. Since this example assumes the availability of a receiver, the "No Receiver Available" is left reset and the "No Sender Available" indicator is set (block 1107, via 1104). The local register junctor LRJ routining module is scheduled (block 913) on return from SRAVAIL.

The routining module (FIG. 8) first instructs the originating marker OM (blocks 1201–1202) to set up a path from a line test inlet LTI (FIG. 1) of the automatic test system ATS to the local register junctor LRJ.

The complete path is shown in FIG. 1 and includes line matrix AB-stage, originating junctor OJ, and line matrix R-stage as part of the path. The maintenance routining logic MRL (FIG. 1) is then put into its start sequence (block 1203), which prepares it for testing the register junctor.

The first part of the local register junctor LRJ routine tests the ability of the junctor to access the sender/receiver matrix (S/RMTX), FIG. 1. This is normally done by connecting a touch calling multifrequency TCMF reciever to the local register junctor LRJ, and having the maintenance routining logic MRL send one digit to the receiver. The presence of the digit is then checked in register-sender RS memory.

Therefore in this example, since a receiver was found to be available, the digit to be sent out is loaded into the maintenance routining adapter output buffer MRAO (block 1205, via 1204). The register-sender RS is then instructed to connect a touch calling receiver to the local register junctor LRJ (block 1206).

The routining module next instructs the register-sender unit 50 to apply dial tone, block 1207, (which is done by operating relay K10 in FIG. 1. Dial tone is then detected via a tone detector which is part of the maintenance test unit MTU. Upon detection of dial tone, the maintenance routining logic advances sequence states, and outpulses the digit placed in the output buffer. The digit is received and stored in the register/sender memory 51 of FIG. 1. Both the register/sender and the maintenance routining logic generates an interrupt to the data processing unit.

After both interrupts have been received the routining module checks register-sender RS memory for the proper digit received (block 1210, via 1208). It then instructs the register-sender RS to drop the receiver (block 1211) and continues with the remainder of the local register junctor LRJ routine, block 1212, which includes setting up the second path shown in FIG. 1, from the originating junctor OJ to a selector test outlet STO via a selector matrix SGX. This path is used to verify the dial pulse sending capability of the register junctor (which makes use of relay K2 in FIG. 1).

At the end of the routine, assuming all tests passed, an all tests passed ATP indicator is set (block 1214, via 1213). The routining module returns module is then scheduled (block 1216, via 1217).

The routining module returns module (FIG. 9) is then given control. The pass counter for the teletype and program TAP queue is incremented (block 1311, via 1301). Then the hardware used in the test is cleared down (block 1312). Since this is a single unit job, the end indicator is set (block 1315, via 1313, 1314). No client is specified, so the request processor is rescheduled and an all tests passed ATP message is output (blocks 1317, 1309, 1310, via 1316).

The request processor gets control again, giving control as before to the continue entry line of the control block module (block 822, via 801, 812) since routining is in progress. The control block, finding the end indicator set in block 902, calls subroutine SSEMSG to output and END message. In SSEMSG, the message suppress indicator is reset as before (block 1004, via 1001, 1002). Data is then set up for the END message (block 1005; and 1009, via 1006, 1008). The working storage for the teletype and program TAP queue (initially set up by the request processor in block 816) is reset in block 1013 (via 1010, 1011). In addition the counters and other indicators are reset for the queue, including the routining in progress indicator (block 1014). The request processor is then rescheduled (block 1018, via 1017) and the END message is output (including the pass, fail, and blockage counts), block 1019.

The request processor searches the queues for any other jobs, and finding none, releases control to the executive (block 825, via 801, 812–815, 819, 823). The automatic test system is then dormant until another request comes into the request scheduler.

EXAMPLE 2

Assume now a teletype and program TAP single unit job with no receiver available. The process for this example is the same as example 1 up to the point where the control block calls subroutine SRAVAIL (in block 912). This time the search of the touch calling receiver TCR assignment table is unsuccessful (block 1102, via 1101) so the "no receiver available" indicator is set (block 1105, via 1104). Since this is a teletype and program TAP job, the "no sender available" indicator is also set (block 1107, via 1106).

The path setup and start sequence portion of the routining module are the same as example 1. However, since no receiver is available, the digit is not loaded and the receiver is not connected, but instead the register sender is instructed to apply dial tone (block 1207, via 1204). Upon detection of dial tone, the maintenance routining logic MRL outpulses the first digit in the output buffer. Since this is zero, nothing is sent. The register-sender RS does not generate an interrupt since nothing is received. The routining module times for 100 milliseconds (block 1209, via 1208) and then instructs the register-sender RS to remove dial tone. The maintenance routining logic MRL 71 upon seeing removal of dial tone, advances sequence states and generates an interrupt the same as if the register-sender RS had automatically removed dial tone upon receiving a digit. The routining module checks for the interrupt (block 1209) and the remainder of the test is performed as before (block 1212).

Assuming the test passed, an all tests passed indicator is set (block 1214, via 1213) and a check is made if a receiver was used in the test. Since one was not, a check is made if a sender is available to the register junctor. For all teletype and program TAP register junctor routines no sender is indicated as available, so the routining module schedules the routining module returns module as in example 1 (block 1216, via 1217–1218).

The "modified" register junctor routine (without a receiver) requires no additions or changes to the maintenance routining logic 71, since the "start of sending-reception of digit interface" (application and removal of dial tone) is performed for both cases by software working with register-sender RS memory 51, and the sending time for the one "pseudo-digit" (90 milliseconds) is also compensated for by software. Therefore the only changes required for testing the local register junctor LRJ without a receiver is in software, which is made generic by branching based on a software switch dependent on a call processing engineerable table. The same scheme is used in the testing of incoming register junctors IRJ's without receivers.

Although the register junctor test can be performed without a receiver, relay K3 (in FIG. 1) is not exercised in this case. (Relay K2 still is, however, since it was also used in the outpulsing of a dial pulse digit during the terminating portion of the test as discussed in example 1 previously). This deficiency (not testing K3) is taken care of by scheduling a multifrequency MF sender routine with the particular register junctor (hereinafter set forth in example 3). This can be done only for time-constraint TIM queue jobs (since the existing "client" mechanism of the teletype and program TAP queue is used to schedule the sender routine). This is not a large restriction, since most routining in an office is done via time-constraint queue requests (to routine all register junctors in a register-sender section, for example). If a single unit test of a register junctor is desired, and no receiver is available to the junctor, a register junctor/multifrequency sender combination test can be specified that will verify the operation of the K3 relay.

EXAMPLE 3

This example is the situation where there is a time-constraint TIM multiple unit job, with no receiver available but with a sender available.

The setup for this example is similar to, but not exactly like, that of examples 1 and 2 since a different queue type is involved. The request comes into the request scheduler, is verified, and is added to the time-constraint TIM queque in block 719 (via 701–704). Assuming no routining is in progress, the request processor is scheduled as before. An ACCEPT message is also outputted. When the request processor gets control, this time it finds the job on the time-constraint TIM queue (block 823, via 801, 812–815, 819), moves the request to working storage, sets the routining in progress indicator, and schedules the control block module.

The control block calls subroutine SSEMSG (FIG. 6) to output a START message, the same as for a teletype and program TAP job (except that the message suppress indicator is reset in block 1004 via 1001 only). On receiving control at the continue entry line (for the first time) the control block module verifies the identity of the first unit to be tested (block 909–910, via 902–905). Indicators and data are set up as before for the routining module, and subroutine SRAVAIL is called (in block 912). Since no receiver is available, the search of the touch calling receiver TCR assignment table fails and the "no receiver available" indicator is set (block 1105, via 1101–1102, 1104). However, since this is a time-constraint TIM job, a search is made of the multifrequency sender MRS assignment table in block 1108 (via 1106). This table, like its companion tables for receivers, is an engineerable table used primarily by call processing.

In this example a sender has been assumed to be available to the register junctor, so the "no sender available" indicator is left reset and return is made directly back to the control block (block 1109). With no receiver available, the routining module performs the test the same as in example 2 above up to block 1218. After finding no receiver available, it finds a sender is available, and calls a system subroutine (block 1219) to obtain the identity of a sender available (graded) to the register junctor being tested. It then formats a request to run a single unit teletype and program TAP multifrequency MF sender routine using the specific register junctor. Running of the sender routine, which uses the same paths as the register junctor routine (FIG. 1), is adequate to verify that the register junctor can access the sender/receiver matrix. Relay K3 is exercised during the connection of the sender and also during the connection of the sender and also during sending over leads RX/TX to leads RT/TT (back to the automatic test system) as shown in FIG. 1.

This sender routine is run immediately following the test on the register junctor, since whenever a teletype and program TAP job is requested from either the teletype or from a program ("client request"), if a time-constraint job is in progress it is deferred temporarily due to the higher priority of teletype and program TAP jobs in the overall queueing structure. Normally this would result in a STOP message being outputted, indicating the routine in progress is being deferred; then a START message, all tests passed ATP or trouble report TR, etc., and an END message output for the teletype and program TAP job.

However, all of these messages, generated for each multifrequency MF sender routine run (each representing one register junctor tested) are in conflict with the philosophy of normally not printing any messages for individual unit tests of a time-constraint TIM job. (An ACCEPT, START, and END message is the only message printed for a time-constraint TIM job with all units passing and no persistent blockages).

Therefore, when the routining modules make a request for the sender routine, it specifies that all messages are to be suppressed (by setting a bit in the queue data request word). This special mechanism, which will be described in detail later, has the effect of making the man-machine interface generic (the same type and number of messages are output for the time-constraint TIM job whether or not receivers or senders are available for the register junctors). In addition this is all accomplished within the framework of the already existing queueing structure.

In block 1221 the routining module schedules the request scheduler to run the sender routine. This request is made as a "client;" the same request type used by the register-sender RS maintenance programs. The request specifies that the routining module returns module ROMRET is to be scheduled back immediately after the request, and that a program counter modify CTRMOD is to be scheduled after the sender routine has been run.

The request scheduler gets control, and adds the request to the teletype and program TAP queue (block 710, via 701–709). Since a client job is specified, the information for scheduling back the client return after the routine has been run (in this case program CTRMOD) is put into the teletype and program queue in block 709. In block 710 the message suppress bit is moved into the queue along with other data.

Since a time-constraint TIM job is in progress, an abort indicator is set (which will defer the time-constraint TIM job) in block 712 (via 711). In addition a "suppress stop message" indicator is set in block 714 (via 713) since messages are to be suppressed. A client job is specified, with the option to return after the request has been processed; so the client return (in this case ROMRET) is scheduled. Routining module returns module (FIG. 9) is thus given control, which increments the pass counter (block 1311, via 1301) for the time-constraint TIM register junctor test just completed (since the time-constraint TIM routining in progress indicator is still set, and the all tests passed ATP indicator was set by the routining module in block 1214). The hardware used for the register junctor RJ test is cleared down (block 1312) and control is passed directly to the request processor since a multiple unit test is in progress (block 1314, via 1313) and individual all test passed ATP messages are not output for multiple unit tests.

The request processor finds the abort indicator set (block 801), and saves necessary indicators. Since a time-constraint TIM job is in progress (block 806, via 802–805) it checks and finds the "suppress stop message" indicator was set. It checks if only the single teletype and program TAP job is queued, and if so resets the routining in progress indicator (block 811, via 807, 809–810). Control then passes back to the top of the request processor.

On the other hand, if the time-constraint TIM job had been deferred, and another teletype and program TAP or repeat job is queued up, a STOP message will be outputted (block 808) by subroutine SSEMSG. The routining in progress indicator is reset as above (block 1007, via 1001, 1004, 1005–1006), the request processor is rescheduled (block 1018) and the STOP message is outputted (block 1019).

In either case control returns to block 801 of the request processor. This time the abort indicator is reset (this was done in block 802), and since no routining is in progress the queues are scanned. Assuming only the client teletype and program TAP job is queued up, it is found in block 815 (via 801, 812–814) as in examples 1 and 2. The sender/receiver control block module similar to FIG. 5 (except it doesn't have the SRAVAIL call, block 912) is given control at its initialization entry line, where it calls (block 901) SSEMSG to output a START message. The message suppress indicator is set in block 1003 (via 1001, 1002) since the message suppress bit is set in the teletype and program TAP queue data word. Therefore the START message is not outputted and control is given directly back to the request processor (from block 1017), via 1005–1006, 1008). The sender/receiver control block is given control again, this time at its continue entry line (block 822, via 801, 812). The unit identity of the sender is verified similar to a register junctor test, and the routining module is given control (block 913). The multifrequency MF sender routine is next run. The routining module is not shown for this since it has no special processing pertinent to the present invention. It sets up a path (such as FIG. 1, if a local register junctor LRJ is being used) and the sender is connected to the register junctor. This checks the operation of the K3 relay which was not checked during the running of the register junctor test.

Assuming the sender routine passes, it returns to the routining module returns module with an "all tests passed indication" and the teletype and program TAP pass counter is incremented (block 1311, via 1301). The hardware is then cleared (block 1312) and the end indicator is set (block 1315, via 1313–1314). Since it is a client job, an "all tests passed" ATP message is not outputted but instead control is given directly back to the request processor (from block 1316).

The sender/receiver control block is given control at its continue entry line, where subroutine SSEMSG is called to output an END message (block 903, via 902). However, since this is a client job, the first pass through SSEMSG results in the client return (in this case CTRMOD) being scheduled and the request processor being rescheduled (blocks 1015–1016, via 1001–1006, 1008–1012). In addition the client indicator only is reset (block 1012).

Program counter modify CTRMOD only returns to the system executive in this case since the sender routine gave an "all tests passed" indication. The request processor, upon getting control, gives control once again to the sender/receiver control block. Subroutine SSEMSG is called again (block 903, via 902) to output an END message. The teletype and program TAP working storage words and routining in progress indicator are reset however (blocks 1013–1014, via 1001–1006, 1008–1011) since the client indicator was reset. Though the message suppress bit in the teletype and program TAP queue data word is reset (block 1013), the message suppress indicator was set in block 1003, so the END message is not outputted but control is given directly to the request processor again.

The request processor, finding no routining in progress (block 812, via 801) searches the queues until it finds the time-constraint TIM job that was deferred (block 819, via 813–815). The indicators saved in block 804 are restored, the routining in progress indicator is set, and the original register junctor job resumes at the continue entry line of the register junctor control block module. Assuming the last unit of the job has not been reached, it increments the unit identity to the next unit to be tested and continues as before (block 908, via 902–906). Therefore, for the entire test of the register junctor (including the scheduling of the sender routine) no extra messages have been outputted. In addition, the pass counter for the time-constraint TIM register junctor routine was incremented, as a result of the rescheduling of ROMRET after the request had been handled by the request scheduler.

Two deviations from this operation should be considered. If the register junctor test does not pass, a failure indication is set in block 1215 and the routining module returns module is scheduled directly (the sender routine is not run). The routining module returns module counts the failure (block 1303, via 1301–1302) and a trouble report TR is outputted for the unit (block 1310, via 1304–1305, 1307–1309). The request processor is also rescheduled, which results in giving control to the register junctor control block to continue the routine with the next unit.

A somewhat more complicated situation occurs if the multifrequency MF sender routine fails. The sender routining module returns a failure indication to the routining module returns module. This results in a trouble report TR on the sender, which also identifies the register junctor in use (in this case the trouble is really presumed to be with the register junctor). However, the failure is pegged on the wrong counter, since the teletype and program TAP failure counter is incremented instead of the time-constraint TIM failure counter for the register junctor job. In addition, the time-constraint TIM pass counter was incorrectly incremented. This occurred when the request scheduler returned to ROMRET (client immediate return) with an all test passed ATP indication for the register junctor. This problem is taken care of when the subroutine SSEMSG is called by the sender/receiver control block for the END message, which results the first time through in the scheduling of program counter modify CTRMOD (client return). As already indicated, when the sender routine returns an all tests passed, CTRMOD just returns to the system executive since the time-constraint TIM pass counter has already been incremented.

If the sender routine fails, however, CTRMOD will adjust the counters by decrementing the time-constraint TIM pass counter and incrementing the failure counter. The teletype and program TAP counters for the sender routine are left as is since no END message is outputted (the counters are reset in block 1013 the second time through SSEMSG).

Eventually the end of the time-constraint TIM register junctor routine is reached when the test for the last unit of the job passes in block 906. The end indicator is set and subroutine SSEMSG is called to output an END message. The time-constraint TIM marking storage is reset (block 1013, via 1001, 1004–1006, 1008–1010) and an END message is outputted (block 1019, via 1014, 1017–1018). Due to the routining in progress indicator being reset (block 1014) and nothing else in the queues, the automatic test system goes idle (as at the end of example 1).

EXAMPLE 4

Assume now a time-constraint TIM multiple unit job, with no receiver or sender available.

This example is the same as example 3 up to the call of SRAVAIL by the register junctor control block (in block 912). SRAVAIL, upon finding no receiver available, will set the "no receiver available" indicator in block 1105 (via 1101–1102, 1104). It then searches the multifrequency MF sender assignment table, and upon finding no sender graded to the register junctor, sets the "no sender available" indicator in block 1107 (via 1106, 1108–1109).

Therefore the register junctor routining module, after getting an all tests passed on the unit, returns directly to the routining module returns module (block 1216, via 1216, 1118) and the sender routine is not scheduled. This is essentially the same as example 2, in which case the K3 relay (FIG. 1) will not be tested. However, since there are no receivers or senders graded to the register junctor, this relay is not used in actual operation and does not need to be tested.

What is claimed is:

1. In a communication switching system having a switching network for establishing connections selectively between calling and called lines under the control of common equipment including a plurality of registers for storing temporarily call processing information received from the calling lines via a plurality of register junctors, said register junctors being enabled to access sending units and receiving units, the common equipment including memory means, a junctor testing arrangement comprising:

common testing circuits for communicating with said register junctors to be tested to send and to receive test information therebetween;

switching means for coupling selectively individual ones of said test circuits to the register junctors via the switching network;

means storing equipment information in said memory means concerning each one of the register junctors as to whether they are enabled to access sending units or receiving units; and means responsive to said equipment information for controlling said switching means to couple said testing circuits in accordance with said equipment information.

2. A testing arrangement according to claim 1, wherein said equipment information designates individually whether the register junctors are enabled to access sending units, or receiving units or both of them or neither of them.

3. A testing arrangement according to claim 2, wherein the register junctors include switching means for coupling selectively the sending units and the receiving units to the network so that the testing circuits can send and receive the test information to the sending units and the receiving units, respectively, via said switching means.

4. A testing arrangement according to claim 3, said switching means including relays.

5. A testing arrangement according to claim 1, wherein said controlling said switching means occurs in accordance with queuing information stored in said memory means.

6. In a communication switching system having a switching network for establishing connections selectively between calling and called lines under the control of common equipment including a plurality of registers for storing temporarily call processing information received from the calling lines via a plurality of register junctors, said register junctors being enabled to address sending units and receiving units, the common equipment including memory means, a method of testing junctors comprising:

providing common testing circuits for communicating with said register junctors to be tested to send and to receive test information therebetween;

coupling selectively individual ones of said test circuits to the register junctors via the switching network;

storing equipment information in said memory means concerning each one of the register junctors as to whether they are enabled to access sending units or receiving units; and controlling said switching means to couple said testing circuits in accordance with said equipment information in response thereto.

7. A method according to claim 6, wherein said equipment information designates individually whether the register junctors are enabled to access sending units, or receiving units or both of them or neither of them.

8. A method according to claim 7, wherein the register junctors include switching means for coupling selectively the sending units and the receiving units to the network so that the testing circuits can send and receive the test information to the sending units and the receiving units, respectively, via said switching means.

9. A method according to claim 8, said switching means including relays.

10. A method according to claim 6, wherein said controlling said switching means occurs in accordance with queuing information stored in said memory means.

* * * * *